Patented June 22, 1937

2,084,731

UNITED STATES PATENT OFFICE 2,084,731

AZO DYESTUFFS

Joseph Gyr and Otto Kaiser, Basel, Switzerland, assignors to Society of Chemical Industry in Basle, Basel, Switzerland No Drawing. Application July 26, 1935, Serial No. 33,416. In Switzerland July 30, 1934

9 Claims. (Cl. 260—27)

It has been found that new dyestuffs capable of being coppered on the fiber or in substance can be obtained by coupling a diazo-compound of the general formula

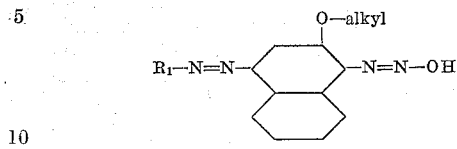

in which $R_1$ represents the radical of a compound of the benzene series which is characterized by the presence of an OH-group and a COOH-group in ortho-position to each other, with a coupling component of the general formula

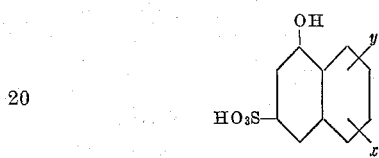

in which $y$ stands for a radical

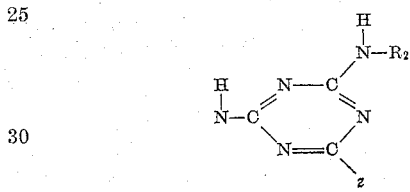

wherein $R_2$ represents the radical of a compound of the benzene series characterized by the presence of an OH-group and a COOH-group in ortho-position to each other, and $z$ represents a hydrogen atom or any desired monovalent radical linked to the carbon atom by an S, O or N-bridge, and in which $x$ stands for a hydrogen atom or an $SO_3H$-group, in which further the sulfo-group $x$ can only stand in the 3- or 4-position to the group $y$

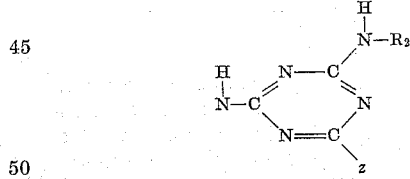

standing in the 1-position.

As compounds of the benzene series represented by the radicals $R_1$ and $R_2$, which are characterized by the presence of an OH-group and a COOH-group in ortho-position to each other, there may be cited inter alia the para-aminosalicylic acid, the ortho-aminosalicylic acid, the para-amino-ortho-cresotihic acid, the 4-sulfo-6-amino-1-hydroxybenzene-2-carboxylic acid, the 4′-amino- or 3′ - amino - 4 - hydroxyazobenzene- 3 -carboxylic acid, the 4′-amino-4-hydroxy-3-methylazobenzene-5-carboxylic acid, the 4′- or 3′-aminobenzoyl-amino-salicylic acid, the 4′-amino-4-hydroxydiphenylamino-2′-sulfo-3-carboxylic acid, the azimide-like or imidazole-like products which are obtained for example by condensing dinitrochlorbenzene and 4-amino-salicylic acid, reducing and diazotizing the condensation product, and so forth. The alkyl-group of the O-alkyl radical of the diazotizing component may consist of 1 or 2 carbon atoms, it may also be of high molecular weight, or of a more complicated composition, such as an $OCH_3$-group, an $OC_2H_5$-group, an $OCH_2\text{-}CH_2\text{-}OH$-group, an $OCH_2\text{-}CH_2\text{-}O\text{-}CH_3$-group, an $O\text{-}CH_2\text{-}COOC_2H_5$-group, an $O\text{-}CH_2\text{-}COONH$-alkyl-group, an $O\text{-}CH_2\text{-}CH_2\text{-}CH_3$-group, an $O\text{-}CH_2\text{-}CH_2\text{-}CH_2\text{-}CH_3$-group, an

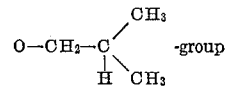-group and the like.

The coupling components which correspond to the above explained formula

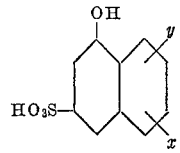

are obtained quite generally by causing 1 mole of cyanuric chloride to react with an aminohydroxynaphthalene-sulfonic acid, such as the 1-amino-8-hydroxynaphthalene-3:6-disulfonic acid, the 1-amino-8-hydroxynaphthalene-4:6-disulfonic acid the 1-amino-8-hydroxynaphthalene-6-sulfonic acid, the 1-amino-5-hydroxynaphthalene-7-sulfonic acid, the 2-amino-5-hydroxynaphthalene-7-sulphonic acid or the 2-amino-8-hydroxynaphthalene-6-sulfonic acid, and by causing 1 mole of one of the above defined compounds of the benzene series to react with 1 mole of the condensation product thus obtained. The secondary condensation products thus formed may be used as such, they may also be united with the diazo compound only after the last labile chlorine atom of the cyanuric chloride has been exchanged for any desired radical which may be, inter alia, the radical of water, of ammonia, of monomethylamine, of dimethylamine, of aniline, of toluidine, of monomethylaniline, of ethyl alcohol, of phenol, of thiophenol, of ethers of aminophenol, or of the above characterized compounds of the benzene series or of the cited aminonaphthols. In the latter case there are obtained azo-dyestuffs of high molecular weight, since there may be used 2 moles of diazo compound.

Consequently, the new dyestuffs correspond to the general formula

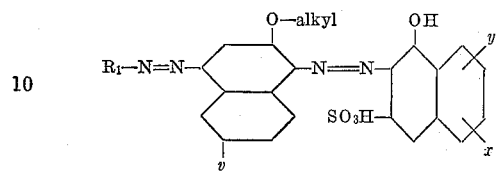

in which $R_1$ stands for the radical of a compound of the benzene series which is characterized by the presence of an OH-group and a COOH-group in ortho-position to each other, in which further $y$ stands for a radical

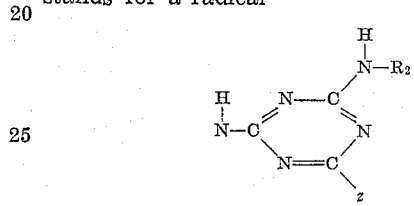

wherein $R_2$ represents the radical of a compound of the benzene series which is characterized by the presence of an OH- and a COOH-group in ortho-position to each other, and $z$ represents an H-atom or a monovalent radical linked to the carbon atom by an O-, S- or N-bridge, $x$ stands for a hydrogen atom or a $SO_3H$-group, in which formula further the sulfo-group $x$ can only stand in the 3- or 4-position to a group

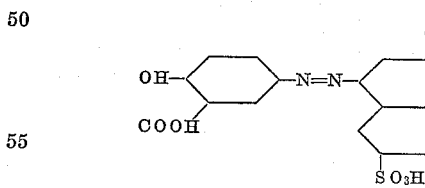

standing in 1-position, and in which $v$ stands for hydrogen or an $SO_3H$-group. The new products are dark powders which dissolve in water on addition of alkalies to blue to green solutions and dye cotton from a neutral or weakly alkaline bath similar tints which, when after-treated with copper on the fiber, become fast to light and washing. The dyeings produced with these dyestuffs have the advantage of better fastness to washing as compared with the dyeings of the dyestuffs containing the cyanuric ring of Patents 1,667,312 and 1,808,849 which also contain an OH-group and a COOH-group in ortho-position to each other. The new dyestuffs may also be used in the form of their copper compounds. They may further be used for dyeing regenerated cellulose, such as viscose artificial silk.

The following example illustrates the invention:—

The diazo-compound made in the known manner from 417 parts by weight of the aminoazo-dyestuff from diazotized 4-amino-1-hydroxybenzene-2-carboxylic acid and 1-amino-2-methoxynaphthalene-6-sulfonic acid is coupled, at 0–5° C., in presence of pyridine, with 664 parts of the ternary condensation product from 1 mol. cyanuric chloride, 1 mol. of 2-amino-5-hydroxynaphthalene-7-sulfonic acid, 1 mol. 4-amino-4-hydroxyazobenzene-3'-carboxylic acid and 1 mol. aniline. There is obtained a pure green fast to light. The dyeing on cotton, after treated with copper sulfate, is characterized by excellent fastness to washing and good fastness to light. The new dyestuff has the following formula

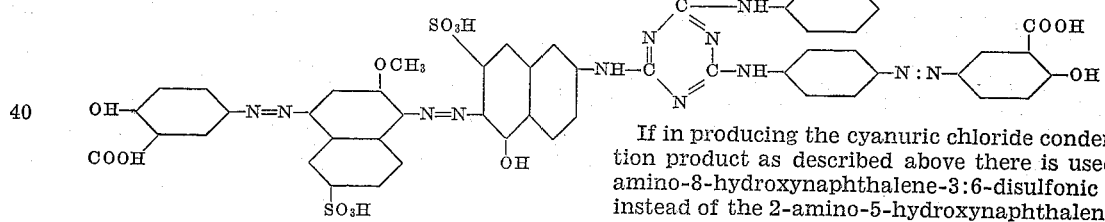

If in producing the cyanuric chloride condensation product as described above there is used 1-amino-8-hydroxynaphthalene-3:6-disulfonic acid instead of the 2-amino-5-hydroxynaphthalene-7-sulfonic acid, there is obtained also a pure green-dyeing dyestuff of the formula

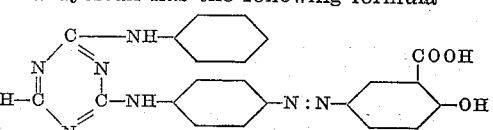
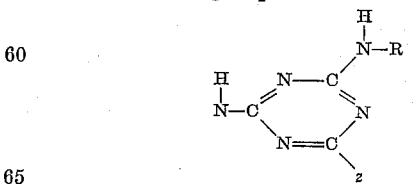
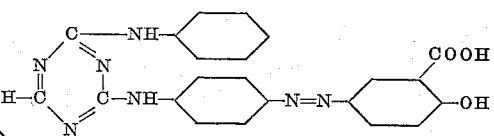

if the 2-amino-5-hydroxynaphthalene-7-sulfonic acid is exchanged for 1-amino-8-hydroxynaphthalene-4:6-disulfonic acid there is obtained a yellowish-green-dyeing dyestuff of the formula

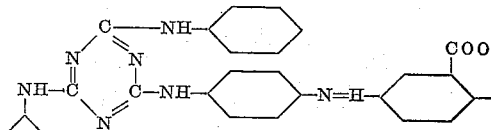
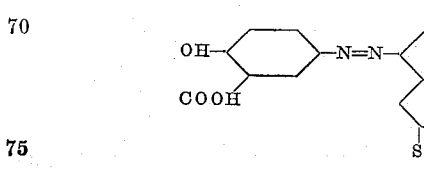

In the following table there is set forth a number of dyestuffs which are obtainable by the present invention:—

| | Starting component | Middle component | Condensation product of 1 mol. cyanuric chloride with 1 mol. each component | | | Color of dyeing on cotton subsequently coppered |
|---|---|---|---|---|---|---|
| (1) | 4-amino-1-hydroxybenzene-2-carboxylic acid. | 1-amino-2-methoxynaphthalene-6-sulfonic acid | 1-amino-8-hydroxynaphthalene-3:6-disulfonic acid. | 4(4'-aminobenzoyl)-amino-1-hydroxybenzene-2-carboxylic acid. | 4(4'-aminobenzoyl)-amino-1-hydroxybenzene-2-carboxylic acid. | Green. |
| (2) | ....do.... | ....do.... | 2-amino-5-hydroxynaphthalene-7-sulfonic acid. | ....do.... | ....do.... | Greenish blue. |
| (3) | ....do.... | ....do.... | ....do.... | ....do.... | 4'-amino-4-hydroxyazobenzene-3-carboxylic acid. | Green. |
| (4) | ....do.... | ....do.... | ....do.... | 4'-amino-5'-methoxy-2'-methyl-4-hydroxyazobenzene-3-carboxylic acid. | 4'-amino-5'-methoxy-2'-methyl-4-hydroxyazobenzene-3-carboxylic acid. | Green. |
| (5) | ....do. (2 mol.) | ....do. (2 mol.) | ....do.... | 2-amino-5-hydroxynaphthalene-7-carboxylic acid. | ....do.... | Green. |
| (6) | 4-amino-4'-hydroxyazobenzene-3'-carboxylic acid. | 1-amino-2-methoxynaphthalene-6-sulfonic acid. | 1-amino-8-hydroxynaphthalene-3:6-disulfonic acid. | 4-amino-4'-hydroxyazobenzene-3'-carboxylic acid. | 4-amino-4'-hydroxyazobenzene-3'-carboxylic acid. | Pure olive-green. |
| (7) | 4-amino-1-hydroxybenzene-2-carboxylic acid. | ....do.... | ....do.... | ....do.... | ....do.... | Yellow green. |
| (8) | 4-amino-4'-hydroxyazobenzene-3' carboxylic acid. | ....do.... | 1-amino-8-hydroxynaphthalene-4:6-disulfonic acid. | ....do.... | Aniline | Green. |
| (9) | 4-amino-1-hydroxybenzene-2-carboxylic acid. | ....do.... | ....do.... | 4-amino-1-hydroxybenzene-2-carboxylic acid. | | Green blue. |
| (10) | 4-amino-1-hydroxybenzene-2-carboxylic acid. | 1-amino-2-methoxynaphthalene-6-sulfonic acid. | 1-amino-8-hydroxynaphthalene-4:6-disulfonic acid. | 4(4'-aminobenzoyl)-amino-1-hydroxybenzene-2-carboxylic acid. | 4(4'-aminobenzoyl)-amino-1-hydroxybenzene-2-carboxylic acid. | Greenish blue. |
| (11) | ....do.... | ....do.... | 1-amino-8-hydroxynaphthalene-3:6-disulfonic acid. | ....do.... | ....do.... | Blue green. |
| (12) | ....do.... | ....do.... | ....do.... | 4-amino-1-hydroxybenzene-2-carboxylic acid. | | Green blue. |
| (13) | ....do.... | ....do.... | ....do.... | ....do.... | 4-amino-1-hydroxybenzene-2-carboxylic acid. | Green blue. |
| (14) | 6-amino-1-hydroxybenzene-2-carboxylic acid. | ....do.... | ....do.... | 4-amino-4'-hydroxyazobenzene-3-carboxylic acid. | Aniline | Yellowish green. |
| (15) | 4-amino-1-hydroxybenzene-2-carboxylic acid. | ....do.... | 2-amino-8-hydroxynaphthalene-6-sulfonic acid. | 4-amino-1-hydroxybenzene-2-carboxylic acid. | 4-amino-1-hydroxybenzene-2-carboxylic acid. | Greenish blue. |
| (16) | ....do.... | ....do.... | 1-amino-5-hydroxynaphthalene-7-sulfonic acid. | ....do.... | ....do.... | Green blue. |

The formula of dyestuff No. 2 of the foregoing table is

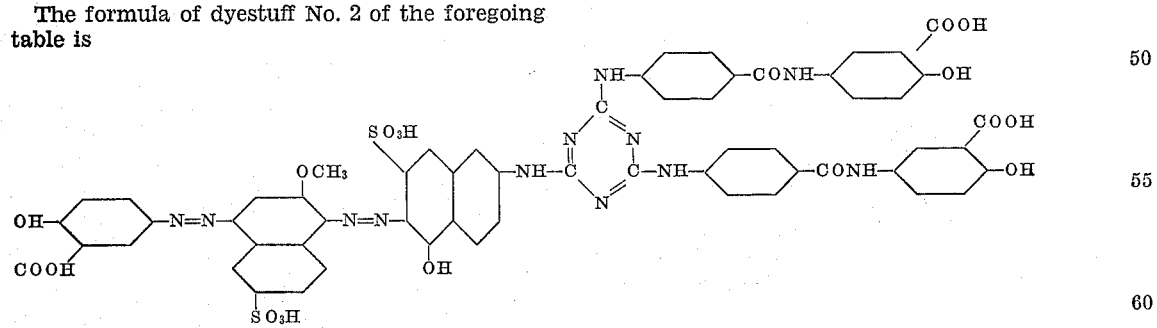

The formula of dyestuff No. 14 of the foregoing table is

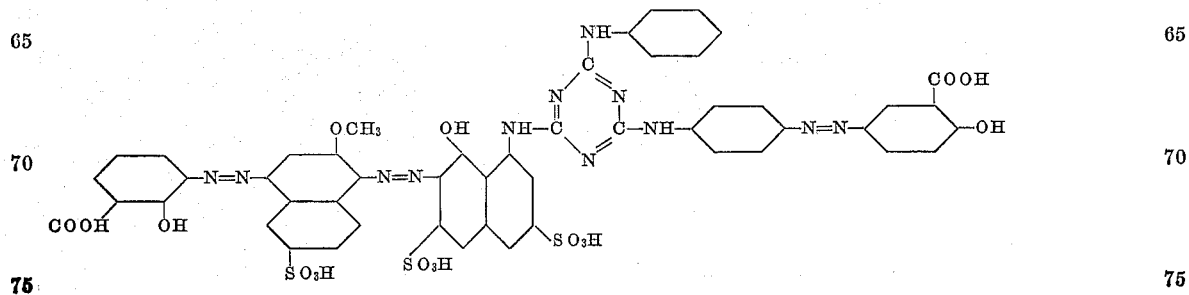

The formula of dyestuff No. 16 of the foregoing table is

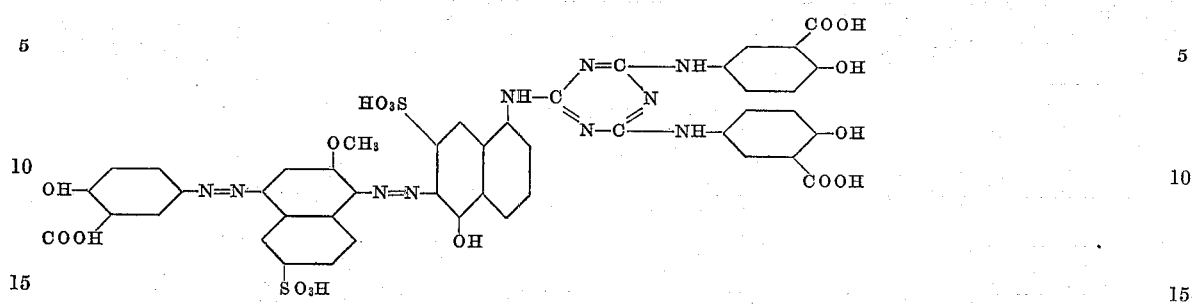

When the dyestuffs are dyed in the form of their copper compounds similar tints are obtained.

What we claim is:—

1. The azo-dyestuffs of the formula in which one $z$ stands for an OH-group and the other $z$ for a hydrogen atom, $v$ stands for a member of the group consisting of hydrogen and the SO$_3$H-group, one $y$ stands for hydrogen and the other $y$ for the radical (in which R$_1$ is a member of the group consisting of monocyclic aryl radicals characterized by having an OH- and a COOH-group in ortho-position to each other, and radicals of the formula —A—B—C, where A is a monocyclic aryl radical, B is a member of the group consisting of $$-\underset{O}{\overset{\|}{C}}-\underset{H}{\overset{|}{N}}-$$

and —N=N—, and C is a monocyclic aryl radical having an OH- and a COOH-group in ortho-position to each other, and R$_2$ stands for a radical of a monocyclic aryl amine), and in which formula the two $x$'s stand for hydrogen if the $y$ standing in α-position represents a hydrogen atom, and one of the $x$'s stands for hydrogen and the other $x$ for an SO$_3$H-group if the $y$ standing in β-position represents a hydrogen atom, which products are dark powders dissolving in water on addition of alkalies to blue to green solutions and dyeing cotton from a neutral or weakly alkaline bath similar tints which, when after-treated with copper on the fiber, become fast to light and washing.

2. The azo-dyestuffs of the formula in which one $z$ stands for an OH-group and the other $z$ for a hydrogen atom, one $y$ stands for hydrogen and the other $y$ for the radical (in which R$_1$ is a member of the group consisting of monocyclic aryl radicals characterized by having an OH- and a COOH-group in ortho-position to each other, and radicals of the formula —A—B—C, where A is a monocyclic aryl radical, B is a member of the group consisting of $$-\underset{O}{\overset{\|}{C}}-\underset{H}{\overset{|}{N}}-$$

and —N=N—, and C is a monocyclic aryl radical having an OH- and a COOH-group in ortho-position to each other, and R$_2$ stands for a radical of a monocyclic aryl amine), and in which formula the two $x$'s stand for hydrogen if the $y$ standing in α-position represents a hydrogen atom, and one of the $x$'s stands for hydrogen and the other $x$ for an SO$_3$H-group if the $y$ standing in β-position represents a hydrogen atom, which products are dark powders dissolving in water on addition of alkalies to blue to green solutions and dyeing cotton from a neutral or weakly alkaline bath similar tints which, when after-treated with copper on the fiber, become fast to light and washing.

3. The azo-dyestuffs of the formula in which one $z$ stands for an OH-group and the other $z$ for a hydrogen atom, one $y$ stands for hydrogen and the other $y$ for the radical (in which R$_1$ is a member of the group consisting of monocyclic aryl radicals characterized by having an OH- and a COOH-group in ortho-position to each other, and radicals of the formula —A—B—C, where A is a monocyclic aryl radical, B is a member of the group consisting of $$-\underset{\underset{O}{\|}}{C}-\underset{\underset{H}{|}}{N}-$$

and —N=N—, and C is a monocyclic aryl radical having an OH- and a COOH-group in ortho-position to each other, and R₂ stands for the radical of aniline), and in which formula the two x's stand for hydrogen if the y standing in α-position represents a hydrogen atom, and one of the x's stands for hydrogen and the other x for an SO₃H group if the y standing in β-position represents a hydrogen atom, which products are dark powders dissolving in water on addition of alkalies to blue to green solutions and dyeing cotton from a neutral or weakly alkaline bath similar tints which, when after-treated with copper on the fiber, become fast to light and washing.

4. The azo-dyestuffs of the general formula

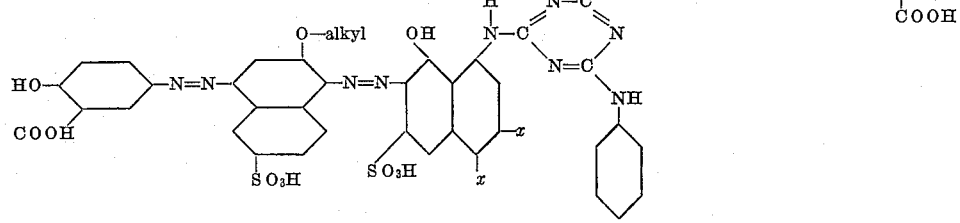

in which alkyl stands for a member of the group consisting of CH₃ and C₂H₅, which products are dark powders dissolving in water on addition of alkalies to green solutions and dyeing cotton from a neutral or weakly alkaline bath similar tints, which, when after-treated with copper, become green and fast to light and washing.

5. The azo-dyestuff of the formula

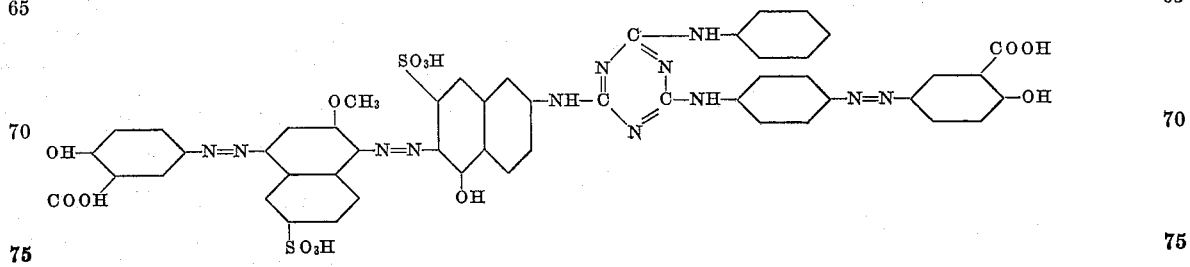

which product is a dark powder dissolving in water on addition of alkalies to green solutions and dyeing cotton from a neutral or weakly alkaline bath similar tints which when after-treated with copper become green and fast to light and washing.

6. The azo-dyestuffs of the general formula

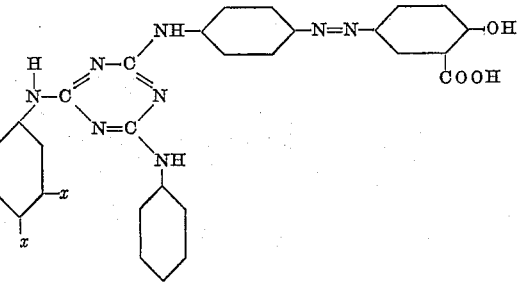

in which one x stands for a hydrogen atom and the other x for a SO₃H-group, which products are dark powders dissolving in water on addition of alkalies to green solutions and dyeing cotton from a neutral or weakly alkaline bath similar tints which, when after-treated with copper, become green and fast to light and washing.

7. The azo-dyestuffs of the general formula

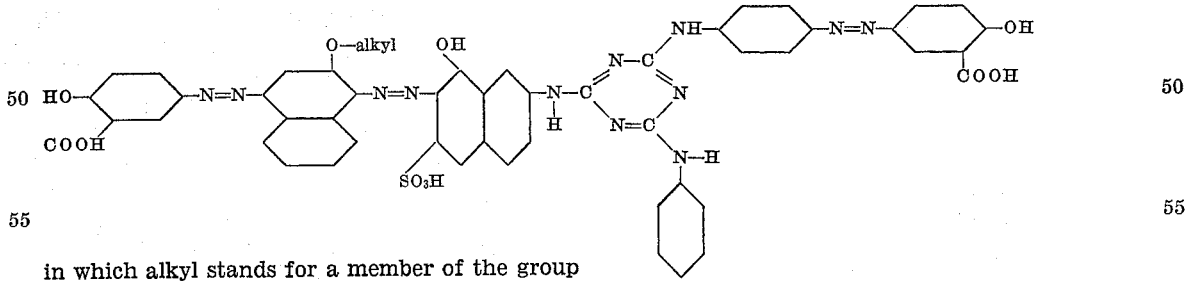

in which one x stands for a hydrogen atom, the other x stands for an SO₃H-group and alkyl stands for a member of the group consisting of CH₃ and C₂H₅, which products are dark powders dissolving in water on addition of alkalies to green solutions and dyeing cotton from a neutral or weakly alkaline bath similar tints which, when after-treated with copper, become green and fast to light and washing.

8. The azo-dyestuff of the formula

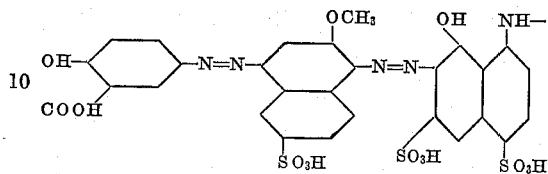

which product is a dark powder dissolving in water on addition of alkalies to green solutions and dyeing cotton from a neutral or weakly alkaline bath similar tints which, when after-treated with copper, become green and fast to light and washing.

9. The azo-dyestuff of the formula

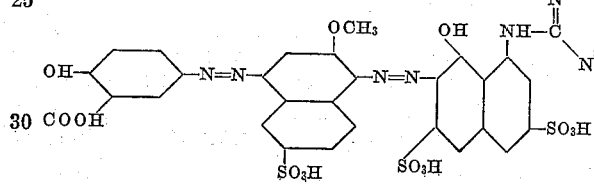

which product is a dark powder dissolving in water on addition of alkalies to green solutions and dyeing cotton from a neutral or weakly alkaline bath similar tints which, when after-treated with copper, become green and fast to light and washing.

JOSEPH GYR.
OTTO KAISER.